United States Patent
Lin et al.

(10) Patent No.: US 6,671,517 B1
(45) Date of Patent: Dec. 30, 2003

(54) METHOD OF AUTOMATIC REPLY FOR RADIO TRANSMISSION AND RADIO MODEM

(76) Inventors: Wei-Kang Lin, 6F, 14, Lane 65, Tung-Pei Street, Taipei (TW); Shih-Yu Tsou, 12F-4, 91, Hsin-I Road Section 2, Taipei (TW); Chih-I Lin, 14292 Spring Vista La., Chino Hills, CA (US) 91709; Shengfu Lin, 3F, 7, Lane 110, Chien-Kang Street, Taipei (TW)

( * ) Notice: Subject to any disclaimer, the term of this patent is extended or adjusted under 35 U.S.C. 154(b) by 365 days.

(21) Appl. No.: 09/633,874

(22) Filed: Aug. 7, 2000

(30) Foreign Application Priority Data

Dec. 16, 1999 (TW) .......................... 88122174 A

(51) Int. Cl.⁷ .................................. H04Q 7/20
(52) U.S. Cl. ................... 455/518; 455/519; 455/334; 370/270; 379/205.01
(58) Field of Search ................. 455/334, 414, 455/426, 509, 518, 519, 521, 557; 370/260, 261, 270, 390; 379/202.01, 204.01, 205.01; 375/222

(56) References Cited

U.S. PATENT DOCUMENTS

| | | | | |
|---|---|---|---|---|
| 4,652,700 A | * | 3/1987 | Matthews et al. | 379/88.26 |
| 5,606,728 A | * | 2/1997 | Keba et al. | 340/7.35 |
| 5,634,196 A | * | 5/1997 | Alford | 455/18 |
| 5,635,914 A | * | 6/1997 | Petreye et al. | 340/7.46 |
| 5,748,100 A | * | 5/1998 | Gutman et al. | 340/7.22 |
| 5,752,196 A | * | 5/1998 | Ahvenainen et al. | 455/518 |
| 5,809,018 A | * | 9/1998 | Lehmusto | 370/330 |
| 5,835,860 A | * | 11/1998 | Diachina | 455/458 |
| 6,363,258 B1 | * | 3/2002 | Schmidt et al. | 455/514 |
| 6,405,050 B1 | * | 6/2002 | Amirijoo et al. | 455/518 |

* cited by examiner

Primary Examiner—William Trost
Assistant Examiner—James D. Ewart
(74) Attorney, Agent, or Firm—Bacon & Thomas, PLLC

(57) ABSTRACT

A radio modem includes a modem: a central processing unit (CPU) connected with the modem for digital data transmission therewith; a read-only-memory (ROM) connected with the CPU; a memory connected with the CPU; and a radio transceiver connected with the modem for receiving/transmitting radio waves and performing an analog signal transmission with the modem. The radio modem has Group ID (GID) and Sort ID functions, and automatically replies according to the order of the Sort ID after identifying the Group ID and confirming that it is necessary to reply.

8 Claims, 4 Drawing Sheets ically and sequentially reply. When replyingcally and sequentially reply. When replying
METHOD OF AUTOMATIC REPLY FOR RADIO TRANSMISSION AND RADIO MODEM

BACKGROUND

The present invention relates to a method of automatic reply for radio transmission and a radio modem, and particularly to a method of automatic reply for a radio transmission having Group ID (GID) and Sort ID functions and a radio modem thereof.

A conventional radio modem does not have Group ID and Sort ID functions. Therefore, a conventional radio modem cannot automatically and sequentially reply. When replying signals is needed, the data and/or commands are transmitted to a member. Said member replies correspondingly. These transmission and reply steps are repeated for a next member. As a result, the period of time for transmission and reply is relatively long and inconvenient when more than one member is involved.

Typical conventional radio modems can be found in U.S. Pat. Nos. 5,592,491; 5,619,531 and 5,694,420. These conventional modems do not have Group ID and Sort ID functions, and can only transmit signals to all members or a specific member during transmission. Such a conventional radio modem cannot perform dialog with a specific group of members and said group of members cannot automatically perform a reply in sequence.

SUMMARY OF THE INVENTION

One objective of the present invention is to provide a method of automatic reply for radio transmission.

Another objective of the present invention is to provide a radio modem.

A further objective of the present invention is to provide a method of automatic reply for radio transmission capable of performing automatic and sequential replies.

A still further objective of the present invention is to provide a radio modem capable of performing automatic and sequential replies.

The present invention uses Group ID and Sort ID functions. Therefore, in addition to transmit signals to all members or a specific member, the invented radio modem can perform signal transmissions to a specific group of members and enable said group of members to reply sequentially, when necessary.

DETAILED DESCRIPTION OF THE INVENTION

Figure 1:
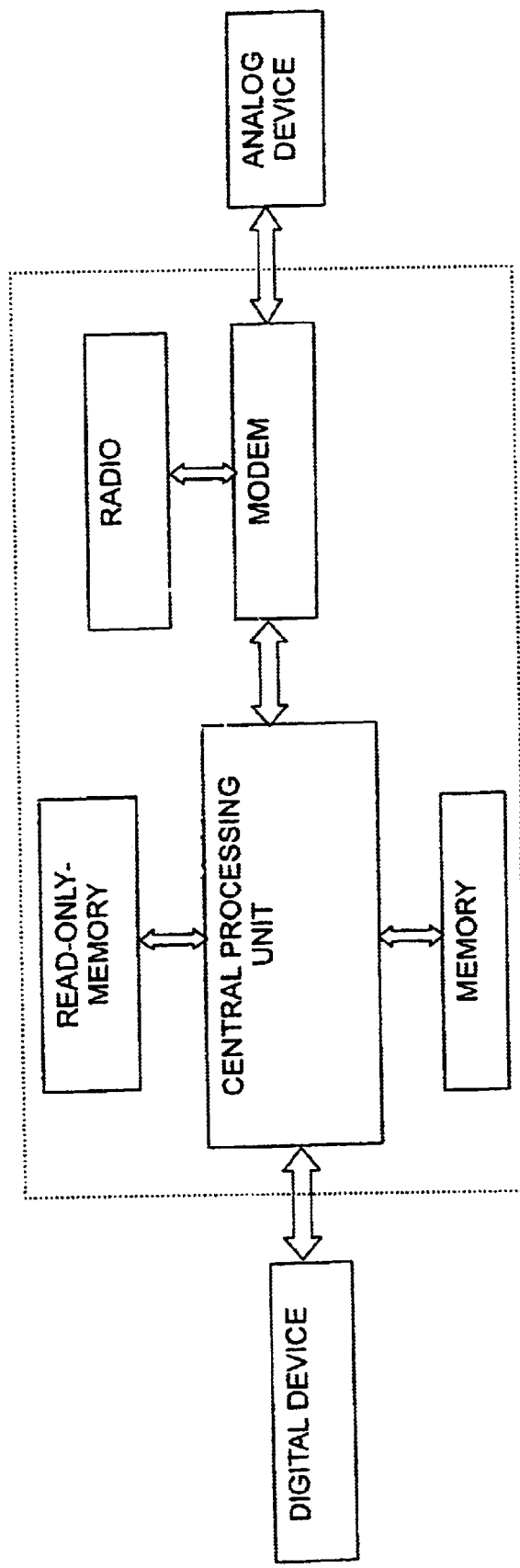
FIG. 1 is a schematic block diagram of a radio modem according to the present invention.

The invented radio modem includes a modem; a central processing unit (CPU) connected with said modem for digital data transmission therewith; a read-only-memory (ROM) connected with said central processing unit; a memory connected with said central processing unit; and a radio transceiver connected with said modem for receiving/transmitting radio waves and performing an analog signal transmission with said modem. The invention is characterized in that said radio modem has Group ID (GID) and Sort ID functions, and automatically replies according to the order of the Sort ID after identifying the Group ID and confirming that it is necessary to reply.

The above-mentioned modem can be an arbitrary conventional modem integrated circuit (IC) or a commercially available modem, or a re-assembled or modified one thereof.

Said CPU can be an arbitrary conventional CPU, or a chipset or similar component having identical functions.

Said ROM can be an erasable programmable read only memory (EPROM), an electrically erasable programmable read only memory (EEPROM), a flash memory, or a similar IC or device, for storing system programs, constant parameters (e.g., system codes, i.e. SID) and/or main programs, etc.

Said memory can be an ordinary memory, such as a static random access memory (SRAM), a flash memory; or an external memory, such as a floppy disk drive (FDD), a hard disk drive (HDD), a compact disk ROM (CD-ROM), etc., for storing variable programs, variable parameters (such as Group ID, and Sort ID), etc.

Said radio transceiver can be an IC with radio transceiving functions or a commercial radio transceiver, or a re-assembled or modified one.

The connections between said modem and said CPU, between said CPU and said ROM, between said CPU and said memory, and between said modem and said radio transceiver can all be done by an arbitrarily conventional connection method, such as a bus connection. Of course, a single chip, such as one consisting of a ROM and a CPU, can also be used.

Said modem can be externally connected with an arbitrary analog device, such as a speaker, a microphone, etc.

Said CPU can be externally connected with an arbitrary digital device, such as a scanner, a computer, etc.

Said Group ID (GID) designates a portion of members to form a member group among the whole members. Said member group has a particular group ID. Of course, the set of all members can comprise one or more member groups, i.e. the monitoring method according to the present invention comprises one or more Group IDs. If two bytes are used as a Group ID, there can be up to 65536 Group IDs. A Group ID per se can also include a debugging code. For example, when two bits are used as a debugging code, the Group ID formed of two bytes can have up to 16384 Group IDs. Of course, the total number of members can use up all the Group IDs or only use a portion of the Group IDs—depending on the number of the member groups. Furthermore, any member can arbitrarily join one or more member groups or refuse to join any member group. Different member groups may own completely identical members, partially identical members or completely different members. Some member groups may even be a subset of another member group.

Said Sort IDs designate members of the same Group ID so that members have an order in said Group ID, and thus replies can be carried out according to said order of Sort IDs when said Group ID is received and replies are needed. The Sort IDs of members within one Group ID can be discontinuous, and preferably are continuous and different from one another.

Said radio modem can use a System ID (SID) and a code ID (CID) of a member for a full call (using SID) or a single call (using CID). Of course, a full call can also be viewed as one type of group calls (using GID). The term "full call" used in the present invention designates a call to all members; whereas the term "single call" designates a call to a single member.

Figure 2:
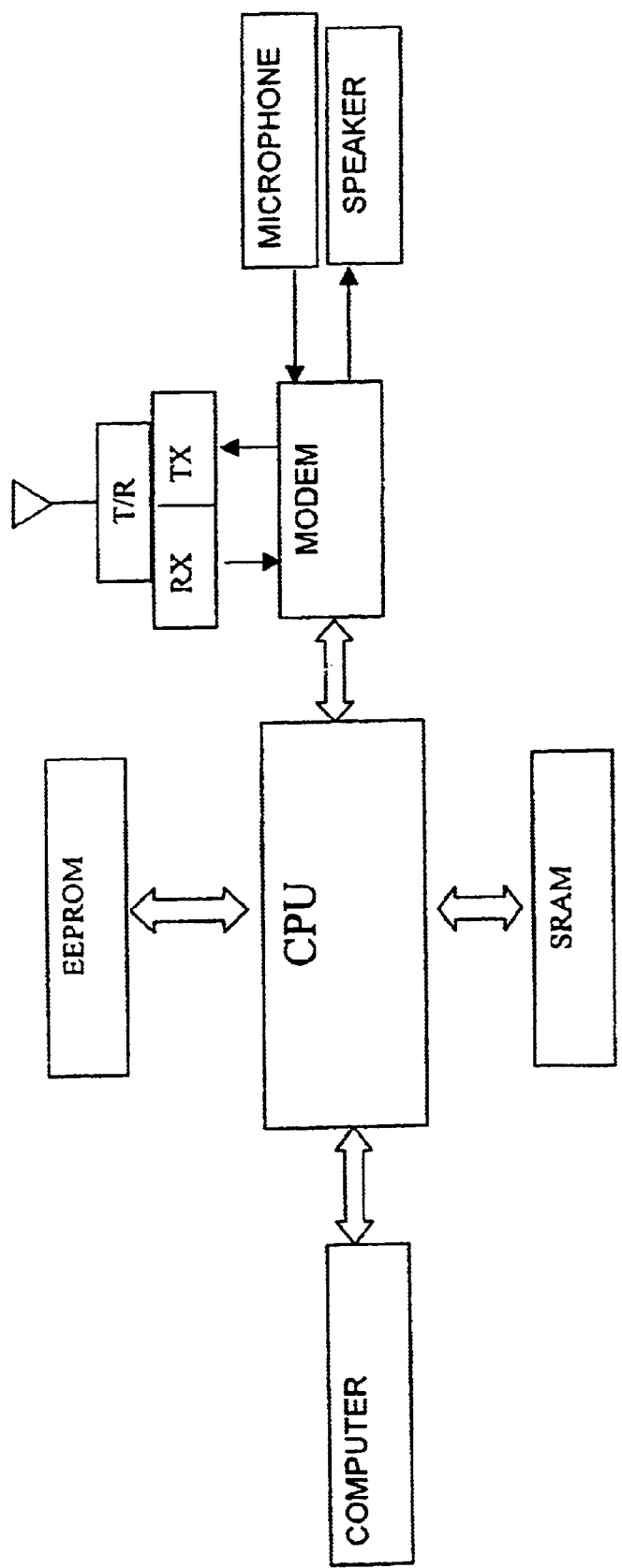
FIG. 2 is a block diagram of a preferred embodiment of the radio modem according to the present invention.

FIG. 1 is a schematic block diagram of a radio modem according to the present invention. The components within the dotted-line frame are essential components. Said CID and said GID are stored in the memory. FIG. 2 is a block diagram of a preferred embodiment of a radio modem of the present invention wherein said ROM is EEPROM; said memory uses an SRAM; said analog device uses a speaker and a microphone; said digital device is a personal computer (PC); and said CID and said GID are all stored in the SRAM.

The invented method of automatic reply for radio transmission comprises:

(1) after receiving a signal by a signal receiving end, identifying a System ID in said signal;

(2) after confirming said System ID, identifying a Group ID in said signal;

(3) after confirming said Group ID, identifying a Reply ID in said signal;

(4) after confirming that a reply is needed, automatically and sequentially replying according to the order of the Sort ID built-in in the signal receiving end, and then restoring to a stand-by mode;

wherein a radio modem restores to a stand-by mode if the identified System ID does not match in Step 1, or if the identified Group ID does not match in Step 2, or if the Reply ID has been identified that a reply is not needed in Step 3; characterized in that the signal receiving end comprises a Group ID identifying function, and an automatic reply function according to the Sort ID.

The System ID, Group ID and Sort ID are all as described above.

The method of identifying the System ID, Group ID and/or Sort ID can adopt an arbitrary conventional hardware, firmware and/or software identification method.

The method of calculating delay time of automatic reply based on the Sort ID and carrying out the delay time and then reply can adopt an arbitrary conventional hardware, firmware and/or software method.

The following embodiments of the present invention all adopt a software/firmware method to solve the above-mentioned problems.

The above-mentioned method is applicable to a wired transmission and a radio transmission, particularly a radio transmission. When applied to a radio transmission, the above-mentioned radio modem of the present invention is preferred.

The term "data" used in the present invention include various IDs, check code (C), prefix code (P), data or command (D/C), etc. For example, see Example 1.

In order to further elaborate the present invention, a preferred embodiment together with related flowcharts are described as follows:

EXAMPLE 1

The down stream signal structure of an air interface is shown in the following:

| The down stream signal structure of an air interface is shown in the following: | | | | | |
|---|---|---|---|---|---|
| P | S | SID | C | CID/GID | D/C |
| 32 | 16 | 14 | 2 | 16 | n | wherein P represents a prefix code which is a continuous 32-bit code encoded according to a data protocol coding; S is a synchronization code and has two bytes for synchronization of the decoding program. When required, said synchronization code can be sent continuously twice (32 bits in total), provided that the whole system shall adopt the same format. C is a check code and has two bits, wherein, for example, 00 and 11 are reserved codes; 01 represents CID; and 10 is GID. SID (14 bits in total), CID and GID (16 bits in total) are defined as in the above. CID and GID are determined according to C, wherein C being 01 is assigned to represent CID, and C being 10 is assigned to represent GID. D/C is data or command and the number of bits thereof is determined according to the need.

The radio modem is configured in an EEPROM:

| | NO. of bits | Domain | Comments |
|---|---|---|---|
| SID | 14 | | This system adopts a same system code. |
| C | 2 | 01 → CID<br>10 → GID | 00, 11 are reserved. |
| CID/GID | 16 | 0~65535 | CID and GID are independent from each other. |
| Sort ID | 8 | 0~255 | The maximum is the number of members in said group. |
| Unit delay value | 16 | 65536 | Adopt 256 msec. | wherein SID, C, CID/GID follow the definition of air interface; and the Sort ID adopts 8-bit, i.e. the number of members in each member group will not exceed 256. Of course, in order to respond to a particular situation where the number of members in a member group exceeds 256, the Sort ID can be larger than 8-bit. However, the signal transmission efficiency will deteriorate if the Sort ID becomes too large.

The following shows a case where the GID and the Sort ID of members are shown in the following Table 1. The numbers in the table are all 16-carry numbers. The topmost row is the GID; and the bottom row is the total number of members in said group. The left-most column is the CID of each member. Other numbers in the table represents the Sort IDs in the GIDs shown on the topmost row of the CID members shown on the left-most column.

TABLE 1

| | 0000 | 0001 | 0002 | 0003 | 0004 | ... |
|---|---|---|---|---|---|---|
| 0000 | 01 | 03 | 01 | | 1A | ... |
| 0001 | | | 02 | | 01 | ... |
| 0002 | 02 | | 05 | | 2B | ... |
| 0003 | | 01 | | 01 | 3D | ... |
| 0004 | | | 03 | | 05 | ... |
| 0005 | | 02 | 06 | | 41 | ... |
| 0006 | 03 | 04 | | 3 | | ... |
| 0007 | | | 04 | | 5F | ... |
| 0008 | 05 | 05 | 1A | 02 | | ... |

TABLE 1-continued

|  | 0000 | 0001 | 0002 | 0003 | 0004 | ... |
|---|---|---|---|---|---|---|
| 0009 |  |  |  |  |  | ... |
| 000A |  | 2F | 0B |  | 82 | ... |
| 000B | 04 |  |  | 04 | 9C | ... |
| 000C |  |  |  |  |  | ... |
| 000D |  | 35 |  | 06 | 07 | ... |
| 000E |  |  | 2C | 05 | 08 | ... |
| 000F | 06 | 05 |  |  |  | ... |
| 0010 | 08 | 26 | 0F |  | A0 | ... |
| 0011 | 07 |  | 0E | 07 | 0E | ... |
| . | . | . | . | . | . |  |
| . | . | . | . | . | . |  |
| . | . | . | . | . | . |  |
| 08AF | 18 |  |  | 08 | A5 |  |
| 08B0 |  | 34 |  |  | A8 |  |
| No. of members | 18 | 35 | 2C | 08 | A8 |  |

From Table 1: The member 0000 (hereinafter the CID represents the member name) belongs to the GID 0000, 0001, 0002, 0004. When an air interface group call is 0000 or 0002, the member 0000 will reply at a $1^{st}$ time (delay time being 256 ms×0). If the air interface group call is 0001, the member 0000 will reply at a $3^{rd}$ time (delay time being 256 ms×2). If the air interface group call is 0004, the member 0000 shall reply at a $26^{th}$ time (26×1+10=26) (delay time being 256 ms×25).

By the same token, if the air interface group call of GID0003 is made, only the 8 members in said group will receive said signal. Under a situation where a reply is needed, said 8 members in the group will automatically reply according to the sequence of CID0003→0008→0006→000B→000E→000D→0011→08AF at $1^{st}$, $2^{nd}$, $3^{rd}$, $4^{th}$, $5^{th}$, $6^{th}$, $7^{th}$ and $8^{th}$ time, respectively (i.e. the delay time being 0, 256, 512, 1024, 2048, 4096, 8192, 16384 ms, respectively).

If an air interface single call is CID000A, only said member can receive said signal. If a reply is needed, the reply will be carried out at a $1^{st}$ time (delay time being 0 ms).

The above-mentioned method of determining a group call is carried out by using a software to read the check code C in the received signal, wherein C=01 represents a single call (CID); while C=10 represents a group call (GID).

The above-mentioned delay time can be completed by using a software loop (FOR . . . NEXT) method. The radio modem carries out an automatic reply by H/L driving, when the delay time is reached.

Figure 3:
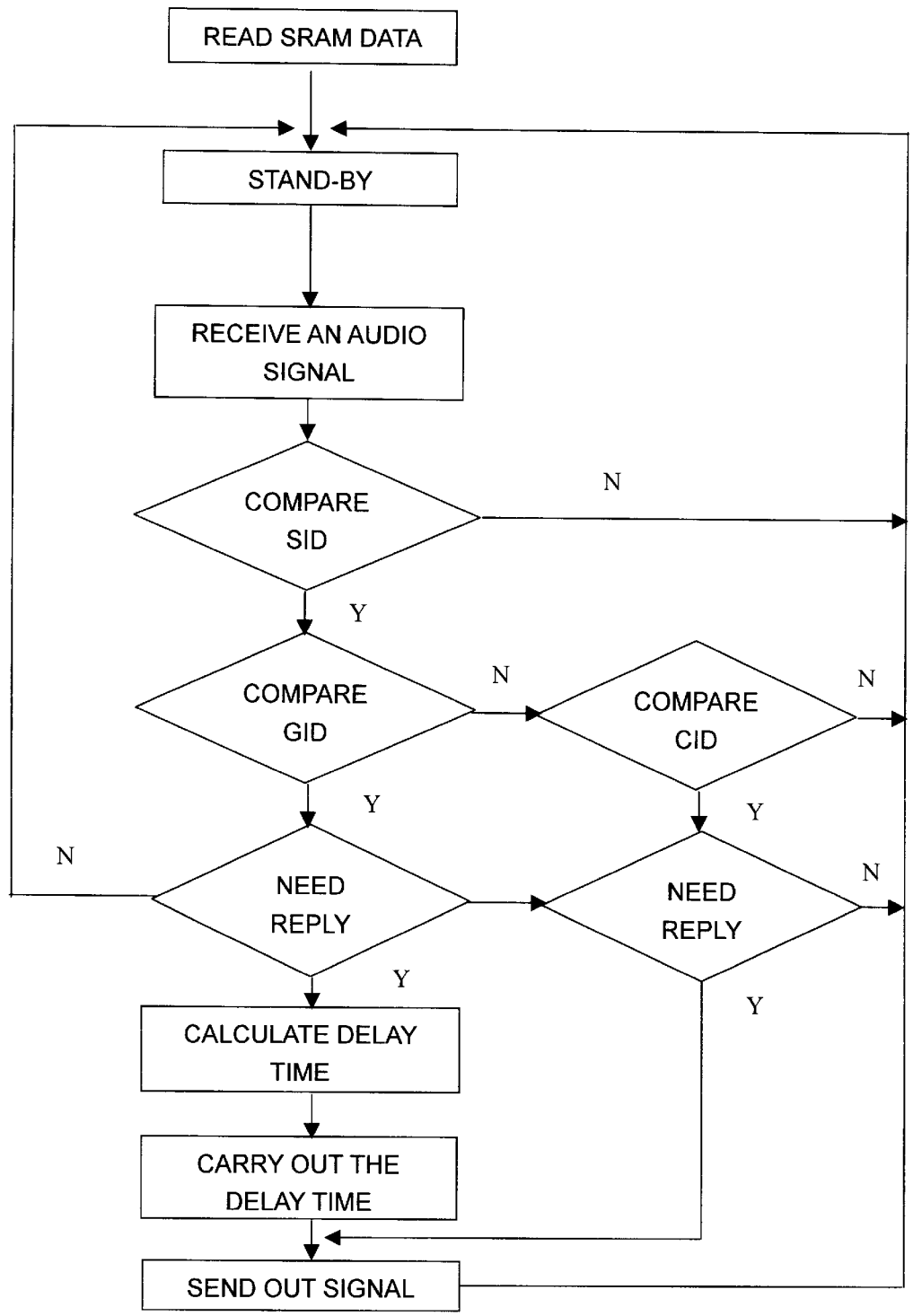
FIG. 3 and FIG. 4 are operation flowcharts of the methods of automatic reply for radio transmission according to the present invention.

The above-mentioned method is shown in FIG. 3. The terminal radio modem first reads the data (including SID, check ID C, CID, Sort ID corresponding to the GID, etc.) in the SRAM; and enters a stand-by state. After receiving a signal, the terminal radio modem will identify SID, and terminal radio modem enters stand-by state if the SID does not match. Otherwise, the terminal radio modem will identify GID. The terminal radio modem will identify the Reply ID if the GID matches. The terminal radio modem will calculate the delay time, carry out the delay time, and sent out signals after the delay time has elapsed, if the identification of the Reply ID confirm a reply is needed. The terminal radio modem will restore the stand-by state, if the identification of the Reply ID confirm a reply is not needed. The terminal radio modem will restore the stand-by state after sending out the signals.

The terminal radio modem will identify the CID if the GID does not match. The terminal radio modem will restore the stand-by state if the CID does not match. Otherwise, the terminal radio modem will identify the Reply ID. The terminal radio modem will send out signals if the identification of the Reply ID confirm a reply is needed. The terminal radio modem will restore the stand-by state, if the identification of the Reply ID confirm a reply is not needed. The terminal radio modem will restore the stand-by state after sending out the signals.

The delay time DT is calculated according to the following formula:

$$DT=256 \text{ msec} \times (n_{OD}-1)$$

wherein $n_{OD}$ represents the value of Sort ID shown in the Table 1 and 256 msec is an example of a predetermined unit delay time ($\Delta T$). The delay time is carried out with a software means, e.g. using a FOR-NEXT loop.

Figure 4:
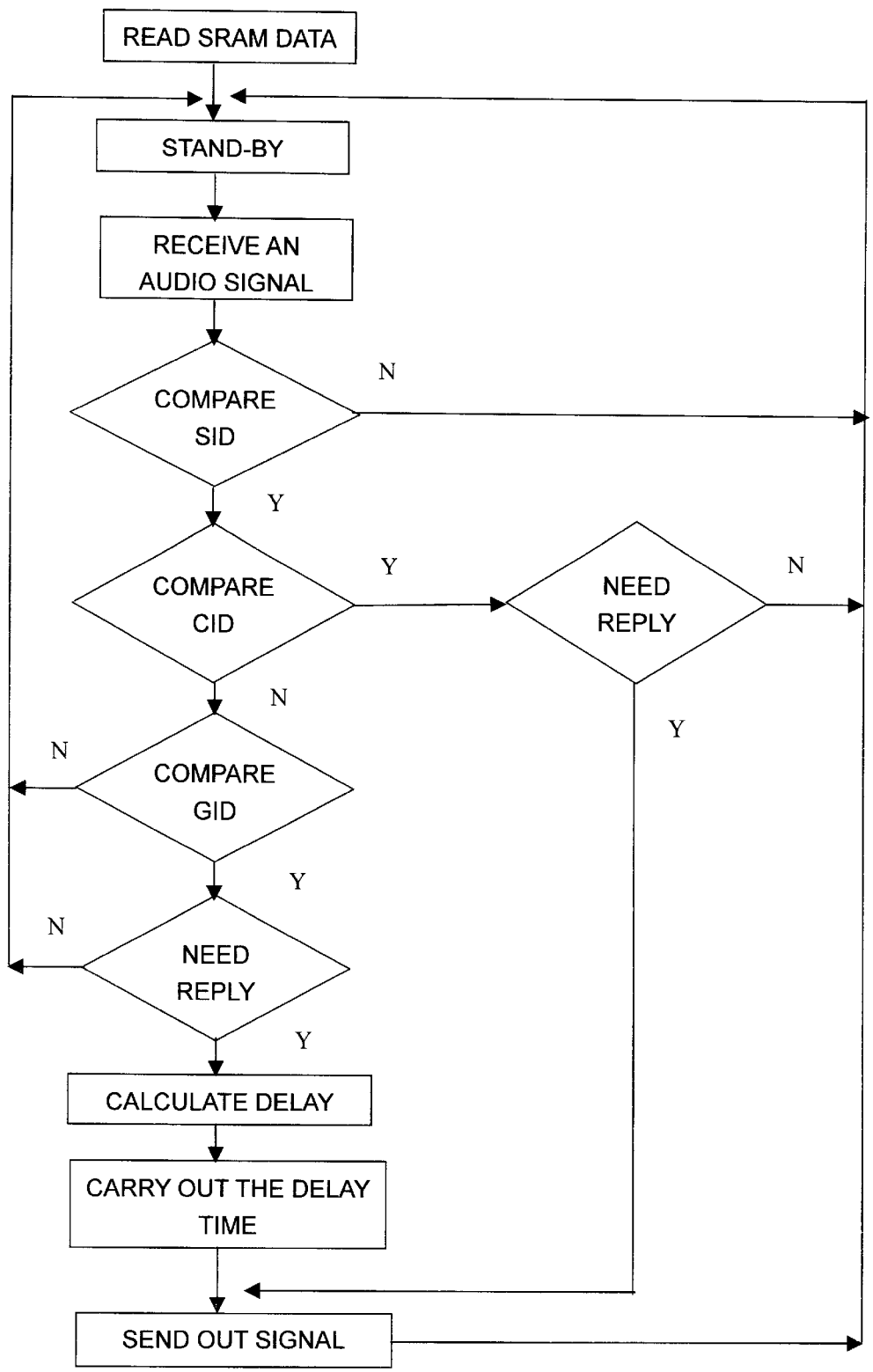

FIG. 4 shows a method similar to the method shown in FIG. 3. The only difference between these two methods is that the method shown in FIG. 3 identifies GID first, then CID; and the method shown in FIG. 4 checks CID first, then GID.

What is claimed is:

1. A radio modem comprising:

a modem;

a central processing unit (CPU) connected with said modem for digital data transmission therewith;

a read-only-memory (ROM) connected with said central processing unit;

a memory connected with said central processing unit;

a radio transceiver connected with said modem for receiving/transmitting radio waves and performing an analog signal transmission with said modem;

characterized in that said radio modem has Group ID (GID) and Sort ID functions, and automatically replies after a delay time DT according to the order of the Sort ID after identifying the Group ID and confirming that it is necessary to reply, wherein $DT=\Delta T \times (n_{OD}-1)$, $\Delta T$ is a predetermined unit delay time, and $n_{OD}$ is a Sort ID.

2. The radio modem as claimed in claim 1, wherein said modem is externally connected with one or more sets of analog devices.

3. The radio modem as claimed in claim 1, wherein said central processing unit is externally connected with one or more sets of digital devices.

4. The radio modem as claimed in claim 1, wherein said Group ID and said Sort ID are stored in said ROM or said memory.

5. The radio modem as claimed in claim 4, wherein said Group ID and said Sort ID are stored in said memory.

6. The radio modem as claimed in claim 1, wherein said memory is a static random access memory (SRAM).

7. The radio modem as claimed in claim 1, wherein said read-only-memory (ROM) is an electrically erasable programmable read only memory (EEPROM).

8. The radio modem as claimed in claim 6, wherein said read-only-memory (ROM) is an electrically erasable programmable read only memory (EEPROM).

* * * * *